United States Patent [19]

Jackson et al.

[11] 3,966,626

[45] *June 29, 1976

[54] HEAT TRANSFER FLUIDS

[75] Inventors: Larry L. Jackson; Walter F. Seifert; Daniel E. Collins, all of Midland, Mich.

[73] Assignee: The Dow Chemical Company, Midland, Mich.

[ * ] Notice: The portion of the term of this patent subsequent to June 10, 1992, has been disclaimed.

[22] Filed: Sept. 17, 1973

[21] Appl. No.: 398,049

Related U.S. Application Data

[63] Continuation-in-part of Ser. No. 154,181, June 17, 1971, abandoned.

[52] U.S. Cl. .................................................. 252/73
[51] Int. Cl.² ......................................... C09K 50/00
[58] Field of Search ............................... 252/73, 57

[56] References Cited

UNITED STATES PATENTS

| | | | |
|---|---|---|---|
| 2,000,886 | 5/1935 | Dow....................................... | 252/73 |
| 2,149,789 | 3/1939 | Rittler et al............................ | 252/73 |
| 3,567,783 | 3/1971 | Brown.................................... | 252/73 |

*Primary Examiner*—Benjamin R. Padgett
*Assistant Examiner*—Deborah L. Kyle
*Attorney, Agent, or Firm*—C. E. Rehberg; R. M. Mellom; G. R. Plotecher

[57] ABSTRACT

Heat transfer agents containing at least about 20 volume percent of diphenyl oxide and at least 20 volume percent of diphenylyl phenyl ether, polyphenyl ether or mixtures thereof have been found to be excellent heat transfer fluids with an unexpectedly broad range of liquidity.

2 Claims, No Drawings

HEAT TRANSFER FLUIDS

CROSS-REFERENCE TO RELATED APPLICATION

This is a continuation-in-part of our application Ser. No. 154,181, filed June 17, 1971 now abandoned.

BACKGROUND OF THE INVENTION

A number of binary heat transfer fluids are known. The eutectic mixture of diphenyl oxide and biphenyl is widely used as a desirable heat transfer fluid. This fluid has a freezing point of 54°F. The components of the binary fluids of the invention are known. Some of these components have been employed in heat transfer fluids prior to the present invention, see for example Giolito et al. in U.S. Pat. No. 3,429,816, Fields at al. in U.S. Pat. No. 3,109,868 and Ritler et al. in U.S. Pat. No. 2,149,789.

None of these references, however, suggests the combinations of the present invention, nor their broad range of liquidity without significant sacrifice of high temperature thermal stability.

SUMMARY OF THE INVENTION

It has now been discovered according to the present invention that fluids having freezing points below about 40°F. and preferably below 32°F. and consisting essentially of at least about 20 volume percent of diphenyl oxide and at least about 20 volume percent of biphenylyl phenyl ether or of polyphenyl ethers containing 3 or 4 phenyl rings or mixture thereof are very desirable heat transfer fluids with an unexpectedly broad range of liquidity. Moreover, these fluids substantially retain the desirable high temperature stability of diphenyl oxide.

The components of the fluid are well known. Polyphenyl ethers of the present invention are those compounds containing 3 or 4 phenyl groups with 2 or 3 ether linkages which may be ortho, para or meta to each other. As commercially produced, these ethers usually contain small amounts of ethers having 5 or more phenyl groups. Such higher polyphenyl ethers are not objectionable so long as those having 3 or 4 phenyl groups predominate. The biphenylyl phenyl ether needs to be explained only in that the particular isomer used in the broad concept of the invention is not critical so long as the freezing point of the final fluid is not more than about 40°F. Thus, the phenoxy group may be in the ortho, para or meta position of the biphenyl. The use of biphenylyl phenyl ether in combination with diphenyl oxide is preferred in the invention, with the use of at least about 5% m-biphenylyl phenyl ether being of special significance because of the low freezing points obtained from the mixtures. As commercially made, the ether contains about 5% by volume of the meta isomer, the remainder being ortho:para in a ratio of about 2:1. This mixture is quite suitable for use without modification.

As noted above, the fluids of the invention are mixtures of at least about 20% of each component. Preferred mixtures contain about 30 to about 70% by volume of diphenyl oxide, with fluids containing about 40 to about 60% by volume of diphenyl oxide being especially preferred because of the desirable freezing points obtained with minimal sacrifice of thermal stability.

The new heat transfer fluids are used in the same manner as known fluids. They, however, have advantages over the higher freezing fluids because of their broader range of liquidity. This advantage permits the use of the fluid under more adverse conditions of temperatures without taking special precautions. For example, the fluids of the invention are suitably used in outside conduits during winter, whereas fluids having a higher freezing point cannot be used or can only be used when the conduit is warmed to prevent freezing.

In addition to a lower freezing point, the fluids of the invention exhibit high boiling points, i.e., above 500°F. This characteristic results in a lower vapor pressure at given temperatures for the compositions of the invention as compared to lower boiling fluids. This lower vapor pressure is advantageous because of the lower design requirements for new equipment and the increased temperatures possible in existing equipment. Also, the work required for maintenance and leak prevention is reduced.

In addition to their desirability as heat transfer fluid, the compositions of the present invention are also suitable for use as lubricants and as hydraulic fluids. The wide temperature range of liquidity of the present fluids allows such use when the fluid must withstand extremes of cold and extremes of heat in a particular application.

Representative properties and compositions of the fluids of the invention are shown in the Specific Embodiments.

SPECIFIC EMBODIMENTS

Examples 1–6 and Comparative Examples A–C — Comparison of Fluids of the Invention with Their Components Binary fluids of the invention were prepared by mixing the base components in the proportions specified to give the fluids shown in Table I. All mixtures of the invention have good thermal stability when heated at 500°F.

TABLE I

Base Components and Fluids of the Invention

| Example | Composition, Volume % | Freezing Pt., °F. |
|---|---|---|
| Comp. A | 100% Diphenyl Oxide (DPO) | 77 |
| Comp. B | 100% Biphenylyl Phenyl Ether (BPE). A mixture of the o, p and m isomers | 99 |
| Comp. C | 100% Diphenoxy Benzene (PPE) A mixture of o, and m isomers | 45 |
| 1 | 35% DPO-65% BPE | 20 |
| 2 | 40% DPO-60% BPE | −23* |
| 3 | 50% DPO-50% 50% BPE | −40* |
| 4 | 55% DPO-45% BPE | − 5 |
| 5 | 60% DPO-40% BPE | 23 |
| 6 | 50% DPO-50% PPE | −26* |

*Very viscous — not a true freezing point

In the same manner as shown above, other fluids of the invention are prepared by mixing diphenyl oxide and at least one component selected from biphenylyl phenyl ether, diphenoxy benzene, di(phenoxyphenyl) oxide and mixtures thereof to obtain a composition containing about 20% to 80% by volume of diphenyl oxide.

Also, in the same manner as described by the examples above, pure m-biphenylyl phenyl ether is substituted for the mixture of isomers of biphenylyl phenyl ether above to obtain very desirable fluids having melting points below those shown for comparable mixtures in Examples 1–5.

Table II shows examples of mixtures of DPO with various isomers of BPE or mixtures thereof while Table III shows fluids consisting of DPO and polyphenyl ethers.

TABLE II

Mixtures of DPO with Various Isomers of BPE
Composition*, %

| Ex. No. | DPO | BPE Isomer Ortho | Meta | Para | F.P., °F. |
|---|---|---|---|---|---|
| 7 | 75 | | 25 | | 40 |
| 8 | 50 | | 50 | | −38** |
| 9 | 25 | | 75 | | − 8 |
| 10 | 50 | 33 | | 17 | 21 |
| 11 | 75 | 12.5 | | 12.5 | 35 |
| 12 | 50 | 25 | | 25 | 34 |
| 13 | 75 | 8.3 | 8.3 | 8.3 | 36 |
| 14 | 50 | 16.7 | 16.7 | 16.7 | 16 |
| 15 | 25 | 25 | 25 | 25 | 34 |
| | 100 | | | | 77 |
| | | 100 | | | 120 |
| | | | 100 | | 61 |
| | | | | 100 | 158 |

*DPO and BPE are, respectively, diphenyl oxide and biphenylyl phenyl ether
**Very viscous – not a true freezing point.

TABLE III

Mixtures of DPO with Polyphenyl Ethers
Composition*, % by Wt.

| Example | DPO | 3P2E | 4P3E | F.P. °F. |
|---|---|---|---|---|
| 16 | 30 | 70 | | −12** |
| 17 | 70 | 30 | | 28 |
| 18 | 30 | | 70 | − 4** |
| 19 | 50 | | 50 | −26** |
| 20 | 70 | | 30 | 36 |
| | 100 | | | 99 |
| | | 100 | | 108 |
| | | | 100 | 45** |

*DPO is diphenyl oxide, 3P2E is diphenoxybenzene and 4P3E is bis(phenoxyphenyl) ether. The latter two materials are mixtures of cogeneric position isomers.
**Pour points of very viscous but not crystalline materials.

While for practical reasons it is usually preferable to use essentially binary mixtures of the technical grade components, i.e., DPO in admixture with either a polyphenyl ether fluid or a BPE fluid, valuable products are also obtained by admixture of DPO, PPE and BPE in any of widely variable proportions. In fact, the freezing points of the binary mixtures can usually be lowered even further by appropriate addition of the third fluid.

We claim:

1. A heat transfer fluid having a freezing point below about 40°F. and consisting essentially of at least about 20% by volume of diphenyl oxide and at least about 20% by volume of a polyphenyl ether having 3 or 4 phenyl rings.

2. The fluid of claim 1 containing a polyphenyl ether having 3 phenyl groups.

* * * * *